United States Patent [19]

Hara et al.

[11] Patent Number: 4,559,685

[45] Date of Patent: Dec. 24, 1985

[54] METHOD OF MANUFACTURING A PISTON FOR INTERNAL COMBUSTION ENGINES

[75] Inventors: Sohichi Hara, Chiryu; Minori Matsuzaki, Nishio, both of Japan

[73] Assignee: Aisin Seiki Kabushiki Kaisha, Kariya, Japan

[21] Appl. No.: 627,528

[22] Filed: Jul. 3, 1984

[30] Foreign Application Priority Data

Jul. 5, 1983 [JP] Japan ............................... 58-122553

[51] Int. Cl.$^4$ ............................................. B23P 15/10

[52] U.S. Cl. .............................. 29/156.5 R; 29/527.1; 29/527.5; 29/559; 29/DIG. 5; 29/DIG. 95; 29/DIG. 105; 164/112; 164/146; 164/498

[58] Field of Search ............ 29/156.5 R, 527.1, 527.5, 29/559, DIG. 5, DIG. 95, DIG. 105; 92/181 R, 186; 123/193 P; 164/112, 146, 147.1, 148.1, 498

[56] References Cited

U.S. PATENT DOCUMENTS 974,024 10/1910 Carter ................................ 164/498
3,349,672 10/1967 Meier et al. ...................... 92/186 X
3,413,897 12/1968 Atkin ............................ 29/156.5 R

FOREIGN PATENT DOCUMENTS 1483526 5/1978 Fed. Rep. of Germany ...... 164/146
158665 9/1962 U.S.S.R. ............................. 164/146

*Primary Examiner*—Howard N. Goldberg
*Assistant Examiner*—Ronald S. Wallace
*Attorney, Agent, or Firm*—Oblon, Fisher, Spivak, McClelland & Maier

[57] ABSTRACT

A method of manufacturing a piston for internal combustion engines which utilize a core molding or casting system for forming a hollow chamber for the passage of cooling oil therethrough. The manufacturing method includes the steps of preparing a core so as to have at least a first and second foot portion extending therefrom; inserting a bar member made of magnetic materials within each of the first and second foot portions; positioning at least one permanent magnet on a core box; and fixing the core to the core box via the bar members due to the magnetic flux of the permanent magnet.

5 Claims, 3 Drawing Figures

METHOD OF MANUFACTURING A PISTON FOR INTERNAL COMBUSTION ENGINES

BACKGROUND OF THE INVENTION

1. Field of the Invention

This invention relates generally to a method of manufacturing a piston for internal combustion engines and more particularly to a method of manufacturing a piston for internal combustion engines which includes the step of forming a hollow chamber in a piston head for the passage of cooling oil therethrough.

2. Description of the Prior Art

In a conventional method of manufacturing a piston for internal combustion engines of this type, for example disclosed in U.S. Pat. No. 3,349,672, a piston assembly comprises a piston head and a collar. A hollow chamber is formed between the piston head and the collar. The seam between the piston head and the collar is welded by charged particle beam welding. However, in this method of manufacture, the following problems are encountered. For example, a relatively large amount of time is required for a welding process utilizing charged particle beams. In addition, the provision for a collar is necessary, thus resulting in an increase in the minimum number of parts in the manufacturing method. Furthermore, obtaining a preferred welding condition is difficult.

In a second conventional method of manufacturing a piston for internal combustion engines of this type, a core molding or casting system is used for forming a hollow chamber in a piston head in order to avoid the aforementioned problems. However, in this method the core is held by a graphite bar via a dead head portion of the piston head so as to prevent upward movement of the core during performance of the molding or casting method. Accordingly, the associated lack of space makes designing of the shape of piston head difficult, especially due to the positioning of the dead head portion with respect to the graphite bar. Furthermore, there is a requirement of withdrawing the graphite bar upon the molten metal added to the mold being caused to flow into the portion of the mold where the graphite bar is positioned. Therefore, an additional step in the method of manufacturing is necessary.

SUMMARY OF THE INVENTION

It is therefore an object of the present invention to avoid the aforementioned problems and other disadvantages of conventional methods of manufacturing a piston for internal combustion engines of the type discussed above.

More particularly, it is an object of the invention to provide an improved method of manufacturing a piston for internal combustion engines so as to avoid the requirement of a graphite bar for holding a core for a core box, which as noted above, results in a manufacturing method which restricts the design of the shape of the piston head and also causes an additional step in the manufacturing process.

According to the present invention, the method of manufacturing a piston for internal combustion engines comprises preparing a core so as to have a plurality of foot portions, inserting a bar member made of magnetic materials within each foot portion and fixing at least one permanent magnet to a core box so as to fix the core thereto via the bar members due to the magnetic flux of the at least one permanent magnet. Consequently, in the present invention, it is not necessary to utilize a graphite bar for fixing the core to the core box.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
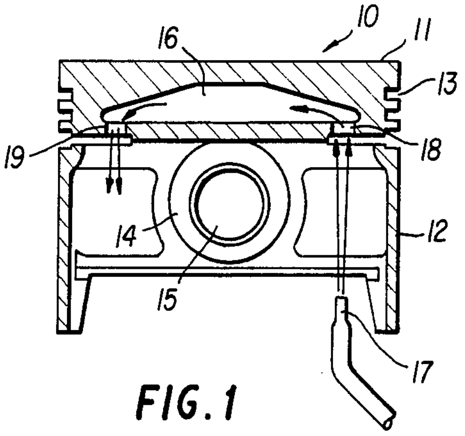
FIG. 1 is a cross-sectional view of a piston according to the manufacturing method of the present invention.

As shown in FIG. 1, a piston 10 having a hollow chamber formed therein comprises a piston head 11 and a piston skirt 12. A plurality of grooves 13 are formed at an outer circumferential surface portion of piston head 11. A piston ring (not shown) is installed within each groove 13.

A pair of bosses 14 are formed so as to extend inwardly from piston skirt 12 in an inner radial direction. A piston pin (not shown) is mounted within an opening 15 formed in each boss 14. A hollow chamber 16 is formed within piston head 11 by the manufacturing method described hereinbelow. Cooling oil indicated by the arrows in FIG. 1 is supplied from an oil pump (not shown) and is injected into hollow chamber 16 via an inlet 18 formed in piston head 9 by an oil jet member 17. The oil circulated in the hollow chamber 16 is caused to flow out from an outlet 19 formed in piston head 11.

Figure 2:
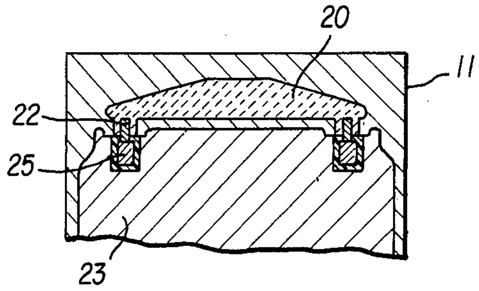
FIG. 2 is a cross-sectional view of a core system according to a preferred embodiment of the present invention.
Figure 3:
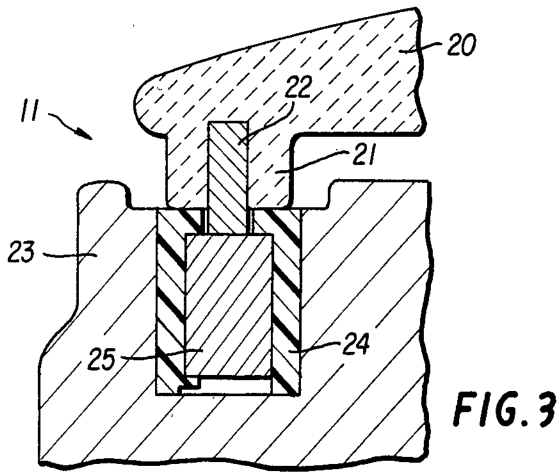
FIG. 3 is a partial, enlarged cross-sectional view of a portion of FIG. 2.

As shown in FIG. 2 and FIG. 3, the core molding or casting system for forming hollow chamber 16 in piston head 11 according to the present invention comprises preparing a core 20 made of ceramic materials having at least a first and second foot portion 21 extending therefrom and which also utilizes a core box 23 operatively associated therewith. A plurality of bar members 22 made of magnetic materials, for example iron or an iron alloy, are respectively inserted into each foot portion 21. At least one permanent magnet 25 is positioned and/or fixed within the core box 23 via a supporting member 24 made of nonmagnetic materials. In this embodiment, the core 20 is effectively fixed to the core box 23 via bar member 22 due to the magnetic flux of permanent magnets 25, whereby displacement of the core 20 with respect to the core box 23 upon casting is effectively prevented. In addition, the inlet 18 and the outlet 19 are formed by respective first and second foot portions 21.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of manufacturing a piston for internal combustion engines so as to form a hollow chamber in a piston head of the piston for the passage of cooling oil, which comprises:

preparing a core so as to have at least a first and second foot portion extending therefrom;

inserting a bar member made of magnetic materials within each of said first and second foot portions;

positioning at least one permanent magnet on a core box; and fixing said core to said core box via said bar members due to the magnetic flux of said permanent magnet.

2. A method of manufacturing as set forth in claim 1, wherein said magnetic materials are selected from the group consisting of iron and an iron alloy.

3. A method of manufacturing as set forth in claim 1, wherein said core further comprises a ceramic material core.

4. A method of manufacturing as set forth in claim 1, wherein said foot portions further comprise means for forming an inlet and an outlet in said hollow chamber in said piston head for passage of said cooling oil.

5. A method of manufacturing as set forth in claim 1, further comprising means positioned on said core box for fixing said permanent magnet to said core box, wherein said means for fixing said permanent magnet is made of nonmagnetic materials.

* * * * *